United States Patent
Aizono

(10) Patent No.: US 11,046,537 B2
(45) Date of Patent: Jun. 29, 2021

(54) IMAGE FORMING APPARATUS, CONTROLLING METHOD, AND PROGRAM

(71) Applicant: CANON KABUSHIKI KAISHA, Tokyo (JP)

(72) Inventor: Keisuke Aizono, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/010,563

(22) Filed: Jun. 18, 2018

(65) Prior Publication Data
US 2018/0361762 A1    Dec. 20, 2018

(30) Foreign Application Priority Data

Jun. 20, 2017    (JP) .............................. JP2017-120752

(51) Int. Cl.
| | | |
|---|---|---|
| *B65H 7/04* | (2006.01) | |
| *B65H 1/00* | (2006.01) | |
| *B41J 11/00* | (2006.01) | |
| *G03G 15/00* | (2006.01) | |
| *G06F 3/12* | (2006.01) | |

(52) U.S. Cl.
CPC ............ *B65H 7/04* (2013.01); *B41J 11/0095* (2013.01); *B65H 1/00* (2013.01); *G03G 15/5016* (2013.01); *G03G 15/5062* (2013.01); *G06F 3/121* (2013.01); *G06F 3/1285* (2013.01)

(58) Field of Classification Search
CPC ............. B41J 11/0095; G03G 15/5016; G03G 15/5062; B65H 7/04; B65H 1/00
See application file for complete search history.

(56) References Cited

U.S. PATENT DOCUMENTS

| | | | | |
|---|---|---|---|---|
| 5,061,958 A | * | 10/1991 | Bunker | ................. G03G 15/502 399/81 |
| 6,108,099 A | * | 8/2000 | Ohtani | .................... G06F 3/121 358/1.14 |

(Continued)

FOREIGN PATENT DOCUMENTS

JP    2013028083 A    2/2013

OTHER PUBLICATIONS

IP.com search (Year: 2019).*

*Primary Examiner* — Shelby L Fidler

(74) *Attorney, Agent, or Firm* — Carter, DeLuca & Farrell LLP

(57) ABSTRACT

A controlling method for an image forming apparatus which has plural sheet containers and can perform printing by using a sheet contained in the sheet container is provided. When there is no sheet in at least one of the sheet containers, it is set whether to perform a notification in consideration of another sheet container. No sheet in the sheet container is detected. When it is not set to perform the notification in consideration of another sheet container, it notifies notification information of no sheet to a preset notification destination in accordance with the detection. When it is set to perform the notification in consideration of another sheet container and there is another sheet container containing a sheet corresponding to the sheet which should be contained in the sheet container in which there is no sheet, it does not notify the notification information in accordance with the detection.

21 Claims, 11 Drawing Sheets

(56) References Cited

U.S. PATENT DOCUMENTS

| | | | |
|---|---|---|---|
| 2005/0046875 A1* | 3/2005 | Gibson | B41J 29/393 358/1.1 |
| 2005/0144623 A1* | 6/2005 | Fujinawa | B41J 29/38 719/318 |
| 2005/0152334 A1* | 7/2005 | Okamoto | H04N 1/00408 370/351 |
| 2006/0062621 A1* | 3/2006 | Saida | B41J 11/0075 400/76 |
| 2007/0280118 A1* | 12/2007 | Takahashi | G06Q 10/087 370/241 |
| 2018/0088515 A1* | 3/2018 | Iguchi | B65H 35/0006 |

* cited by examiner

FIG.9

| MAIL NOTIFICATION RELATED INFORMATION | | |
|---|---|---|
| SETTING OF MAIL NOTIFICATION | | |
| | MAIL ADDRESS | aaa@xxx.co.jp |
| | NO TONER | ON |
| | COLLECTED TONER FULL | OFF |
| | NO STAPLE | OFF |
| | NO PAPER | ON |
| | CONFIRMATION OF ANOTHER PAPER FEEDING STAGE | ON |
| | PAPER OF NO NOTIFICATION | OFF |
| | JAM | OFF |
| | SERVICE CALL | OFF |
| TRANSMITTED FLAG | | |
| | TONER (Y) | OFF |
| | TONER (M) | OFF |
| | TONER (C) | OFF |
| | TONER (K) | OFF |
| | COLLECTED TONER FULL | OFF |
| | NO STAPLE | OFF |
| | NO PAPER (PAPER FEEDING STAGE 1) | OFF |
| | NO PAPER (PAPER FEEDING STAGE 2) | OFF |
| | NO PAPER (PAPER FEEDING STAGE 3) | OFF |
| | NO PAPER (PAPER FEEDING STAGE 4) | OFF |
| | JAM | OFF |
| | SERVICE CALL | OFF |
| MAIL NOTIFICATION RELATED INFORMATION | | |
| MAIL NOTIFICATION RELATED INFORMATION | | |

From : device@xxx.co.jp
To : aaa@xxx.co.jp
Date : 2016 / 01 / 01 9:00
Subject : 【MAIL NOTIFICATION】 NO PAPER OCCURRENCE DATE AND TIME : 2016 / 01 / 01 9:00
SERIAL NUMBER : AAA00001
INSTALLATION SITE : OA CORNER ITEMS TO BE NOTIFIED
- PAPER FEEDING STAGE 1 : NO PAPER
- PAPER FEEDING STAGE 2 : NO PAPER

IMAGE FORMING APPARATUS, CONTROLLING METHOD, AND PROGRAM

BACKGROUND OF THE INVENTION

Field of the Invention

The present invention relates to an image forming apparatus, a controlling method for the image forming apparatus, and a program for the controlling method.

Description of the Related Art

Conventionally, such a technique of, when an event such as no paper (no sheet), no toner or the like occurs in an image forming apparatus, notifying a state of the image forming apparatus to a preset notification destination has been known. Here, as will be described later, it should be noted that "paper" is an example of "sheet". Thus, an administrator of the image forming apparatus can receive a notification at timing when some action is necessary for the image forming apparatus, and it is possible to prevent such a situation that the image forming apparatus is left in an unusable state. An image forming apparatus which can switch a notification destination in accordance with an action content or user authority is disclosed in Japanese Patent Application Laid-Open No. 2013-28083.

SUMMARY OF THE INVENTION

According to one aspect of the present invention, there is provided an image forming apparatus having a plurality of sheet containing units and capable of performing printing by using a sheet contained in the sheet containing unit, and comprising at least one memory device that stores a set of instructions and at least one processor that executes the instructions, the instructions, when executed, causing a print control apparatus to perform operations comprising: upon condition that the sheet contained in at least one of the sheet containing units disappeared, setting whether or not to perform a notification in consideration of another sheet containing unit; detecting that the sheet contained in the sheet containing unit provided for the image forming apparatus disappeared; upon condition that it is not set by the setting to perform the notification in consideration of another sheet containing unit, controlling to notify notification information of no sheet to a preset notification destination in accordance with the detection that the sheet contained in at least one of the sheet containing units disappeared; and upon condition that it is set by the setting to perform the notification in consideration of another sheet containing unit and there is another sheet containing unit containing a sheet corresponding to the sheet which should be contained in the sheet containing unit from which the sheet disappeared, controlling not to notify the notification information to the preset notification destination in accordance with the detection that the sheet contained in the sheet containing unit disappeared.

Further features of the present invention will become apparent from the following description of exemplary embodiments with reference to the attached drawings.

BRIEF DESCRIPTION OF THE DRAWINGS

FIG. 9 is a diagram illustrating an example of data which is saved in an EEPROM.
FIG. 11 is an example of mail data.

DESCRIPTION OF THE EMBODIMENTS

Preferred embodiments of the present invention will now be described in detail in accordance with the accompanying drawings. In the embodiment, in an image forming apparatus having a plurality of paper feeding stages for containing paper which is used for printing, a mechanism which can properly perform a notification of no paper is provided in consideration of a case where when an event of no paper in any one of the paper feeding stages occurs, if a notification to an administrator is uniformly performed, a convenience deteriorates on the contrary.

For example, when paper (for example, plain paper of a letter size) whose use frequency is high has been contained in a plurality of paper feeding stages, there is a case where even if all of the paper contained in one paper feeding stage was fully used, printing can be continued by using the same paper contained in another paper feeding stage. Therefore, in the embodiment, there is provided such a mechanism that a mode in which a notification is performed at timing when the paper in one paper feeding stage has disappeared and a mode in which a notification is performed at timing when the same paper has disappeared even in consideration of other paper feeding stages are made different in accordance with an intention of the user. For example, an installation environment where when the paper in the paper feeding stage of the paper whose use frequency is high has disappeared, the user himself who uses the image forming apparatus instead of the administrator supplies paper is considered. In such an installation environment, there is also a case where if a notification is performed to the administrator each time the paper disappears, it is troublesome for the administrator.

Figure 1:
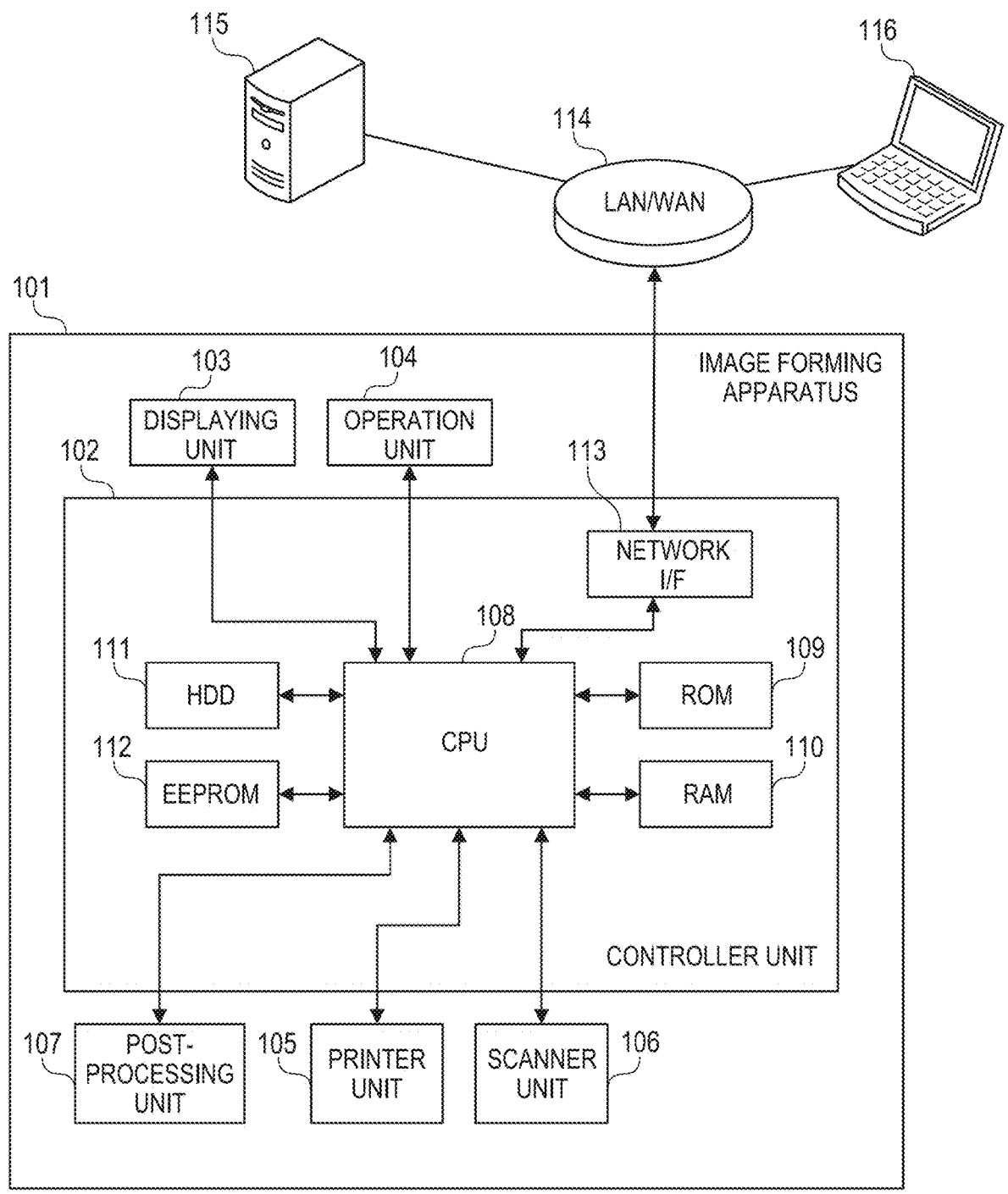
FIG. 1 is a whole constructional diagram of a system.

FIG. 1 is a whole constructional diagram of a system. An image forming apparatus 101, a PC (Personal Computer) 116, and a mail server 115 are connected to a network 114 so that they can communicate with each other. The image forming apparatus 101 and the PC 116 are connected to Internet (not illustrated) through the network 114 and can transmit and receive E-mail to/from an external apparatus via a plurality of mail servers. The image forming apparatus 101 can transmit E-mail to the PC 116 through the mail server 115.

The mail server 115 plays a role of delivery, transmission, and reception of E-mail. The mail server 115 receives the E-mail through the network 114. The received E-mail is distributed into a mail box provided every E-mail address and saved into a storage (not illustrated). Each of the E-mail addresses is managed in association with user information (user name and password).

Mail clients have been installed in the PC 116. The mail client installed in the PC 116 transmits E-mail to the outside through the mail server 115 or receives E-mail from an external apparatus such as an image forming apparatus 101 or the like and displays. The mail client of the PC 116 receives the E-mail delivered to a mail box of the mail server 115 by using a communication protocol such as POP3, IMAP, or the like. A Web browser has also been installed in the PC 116. The Web browser accepts a user instruction such as an input or the like of a URL (Uniform Resource Locator), receives a Web page from a Web server (not illustrated), and can display the Web page to an operation unit (not illustrated) of the PC 116.

The image forming apparatus 101 has a Web server for allowing the user to perform various kinds of settings of the image forming apparatus 101 through the Web browser of the PC 116. When an IP address of the image forming apparatus 101 or a host name is input to an address input column of the Web browser by the user, the Web browser of the PC 116 receives a Web page for performing various kinds of settings from the image forming apparatus 101 and displays onto the operation unit. The user can perform the setting of the image forming apparatus 101 through the Web page for performing the various kinds of settings. A mail notification setting, which will be described hereinafter, can be also performed from the Web browser.

Subsequently, a construction of the image forming apparatus 101 will be described. The image forming apparatus 101 has a controller unit 102, a displaying unit 103, an operation unit 104, a printer unit 105, a scanner unit 106, and a post-processing unit 107. The displaying unit 103 is a liquid crystal display screen or the like and displays various kinds of information. The operation unit 104 is a keyboard or the like and accepts the operation of the user. The displaying unit 103 and the operation unit 104 may be integratedly provided as a liquid crystal displaying unit having a touch panel.

The printer unit 105 accepts a print instruction from the controller unit 102 and prints image data which is transmitted from the controller unit 102 onto paper. As a printing system of the printer unit 105, an electrophotographic system in which toner is fixed onto paper and an image is printed thereon may be used or an ink jet system in which ink is emitted onto paper and an image is printed thereon may be used. In the embodiment, the electrophotographic system will be described as a prerequisite. In the case of the electrophotographic system, since the printing is performed by using toner, if the toner disappears, the apparatus enters an unprintable state. Such a state is called "no toner" and it is necessary to exchange a toner container. In a process for printing the toner onto the paper, toner which is not used for the printing of the paper occurs. Such a toner is called "collected toner". The collected toner is collected into a collected toner container of the printer unit 105. A state where the collected toner container is full is called "collected toner full" and it is necessary to exchange the collected toner container.

As an event in which it is necessary to take a countermeasure by the user other than the toner related events, there is an event such as no paper or jam. The state of no paper denotes a state where the paper which is necessary for the user to perform a desired printing does not exist in the paper feeding stage of the printer unit 105. The paper feeding stage will be described in detail hereinafter with reference to FIG. 2. The state of jam denotes a state where a paper jam occurs on a conveying path of the printer unit 105. When the jam occurs, the user needs to remove the jammed paper by opening a cover or the like of the printer unit 105. The events regarding the printing such as no toner, collected toner full, no paper, jam, and the like are notified to the controller unit 102 from the printer unit 105 when they occur. As an event in which it is necessary to take a countermeasure by the user, there is a service call. The service call is a state where there is a problem on the image forming apparatus 101 and it is necessary to take a countermeasure by the service man.

The scanner unit 106 accepts a reading instruction from the controller unit 102, executes the reading operation, and transmits the image data to the controller unit 102. The post-processing unit 107 executes a post-process of a staple to the printed paper which was output from the printer unit 105. Specifically speaking, the post-processing unit 107 executes a process for binding a bundle of a plurality of printed paper by using one or more staples. A state where there are no staples for binding is called "no staple". When the apparatus enters such a state, the post-processing unit 107 notifies the controller unit 102 of such a state.

The controller unit 102 has a CPU (Central Processing Unit) 108, a ROM (Read Only Memory) 109, and a RAM (Random access Memory) 110. The controller unit 102 also has an HDD (Hard Disk Drive) 111 and an EEPROM (Electrically Erasable Programmable ROM) 112. The controller unit 102 also has a network I/F (interface) 113.

The controller unit 102 including the CPU 108 controls the operation of the whole image forming apparatus 101. The CPU 108 reads out a control program stored in the ROM 109 or HDD 111 and performs various kinds of control such as print control, reading control, and the like. The ROM 109 is a read only memory. A boot program and the like necessary to activate the system have been stored in the ROM 109. The RAM 110 is a volatile memory and is a work memory which is necessary when executing the control program. The HDD 111 is a storage medium such as a magnetic disk or the like and stores the control program, image data, and the like. The EEPROM 112 is a non-volatile memory. Setting values and the like which are necessary when the control program is executed have been stored in the EEPROM 112. Information of the paper feeding stage setting and information related to a mail notification, which will be described hereinafter, have also been stored in the EEPROM 112.

The controller unit 102 is connected to the network 114 through the network I/F 113. The CPU 108 transmits E-mail to an external apparatus via the network I/F 113 or receives print data and information from the external apparatus on the network. Functions and processes of the image forming apparatus 101, which will be described hereinafter, are realized when the CPU 108 reads out the program stored in the ROM 109 or HDD 111 and executes the program.

On the image forming apparatus 101, the Web server for providing the Web page to perform the various kinds of settings from the external apparatus operates. The Web server of the image forming apparatus 101 transmits the Web page for setting in accordance with an HTTP request from the external apparatus such as a PC 116 or the like. The Web server receives contents of the setting performed through the Web page for setting in accordance with the HTTP request from the external apparatus such as a PC 116 or the like. The received setting contents are stored in the EEPROM 112.

Figure 2:
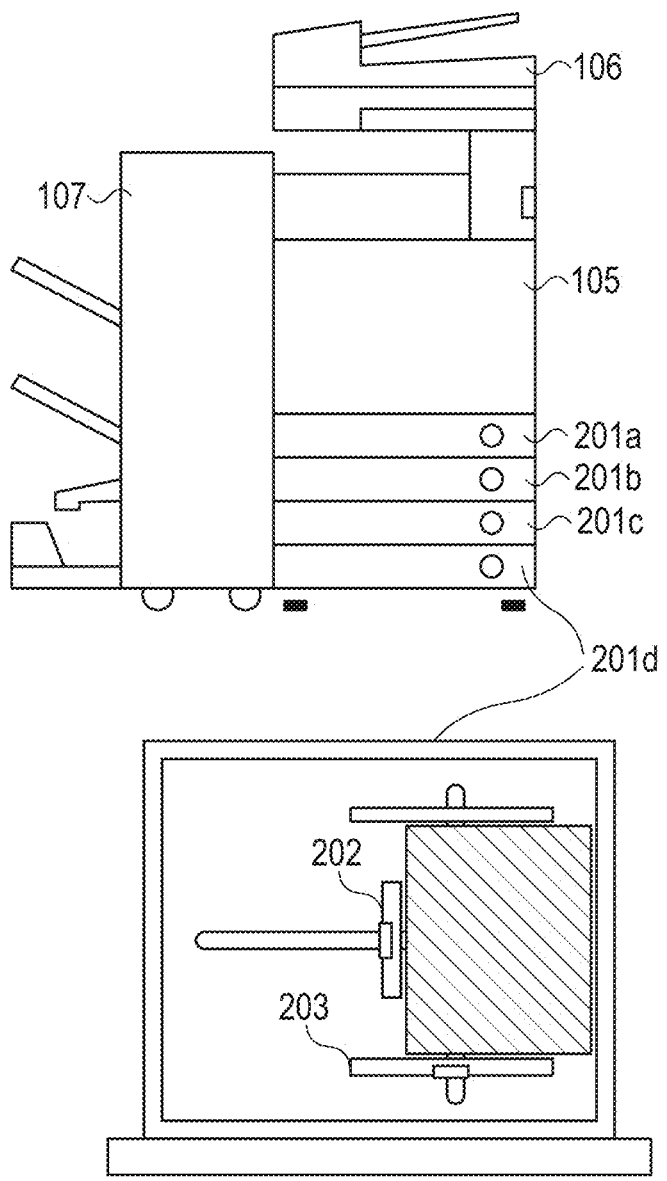
FIG. 2 is an external view of an image forming apparatus.

FIG. 2 is an external view of the image forming apparatus 101. The scanner unit 106 is arranged over the printer unit 105. The post-processing unit 107 is arranged in a left portion of the printer unit 105. The printer unit 105 has a plurality of paper feeding stages 201a, 201b, 201c, and 201d. Each of the paper feeding stages 201a to 201d holds paper. Although a case where the image forming apparatus 101 has the four paper feeding stages is illustrated as an example in FIG. 2, the number of paper feeding stages is not limited to 4. For example, the image forming apparatus 101 may have another paper feeding deck or the like which can be connected as an option. As another example, the image forming apparatus 101 may have five or more paper feeding stages. Each of the paper feeding stages 201*a* to 201*d* and the paper feeding deck which can be connected as an option are examples of sheet containing units. The paper to be contained in the paper feeding stage is an example of sheet.

Subsequently, a construction of the paper feeding stage will be described with respect to the paper feeding stage 201*d* as an example. Each paper feeding stage has paper guides indicated by 202 and 203. The user adjusts the paper guides 202 and 203 in accordance with a width of paper to be contained in each paper feeding stage and subsequently stacks the paper for printing. The printer unit 105 detects positions of the paper guides by sensors (not illustrated), thereby determining a size of paper currently stacked in the paper feeding stage. Each paper feeding stage has a paper remaining quantity sensor and can detect whether or not the paper has been contained in each paper feeding stage. Those detected information is notified to the controller unit 102 from the printer unit 105 and is properly referred to in the case of making control in flowcharts, which will be described hereinafter, or in the case of displaying a setting screen regarding the paper feeding stage.

Paper of various sizes and various types is contained in the paper feeding stages 201*a* to 201*d*. In order to make proper print control in accordance with the paper type, the image forming apparatus 101 of the embodiment can register the types of paper contained in the paper feeding stages. In the embodiment, the apparatus has such an ACC (Auto Cassette Change) function that if all of the paper contained in one paper feeding stage has fully been used during the printing, such a paper feeding stage is switched to another paper feeding stage and the printing is continued. According to the ACC function, when all of the paper contained in one paper feeding stage has fully been used during the printing, if other substitutable paper had been contained in another paper feeding stage, the printing is continued by using such paper.

Figure 3:
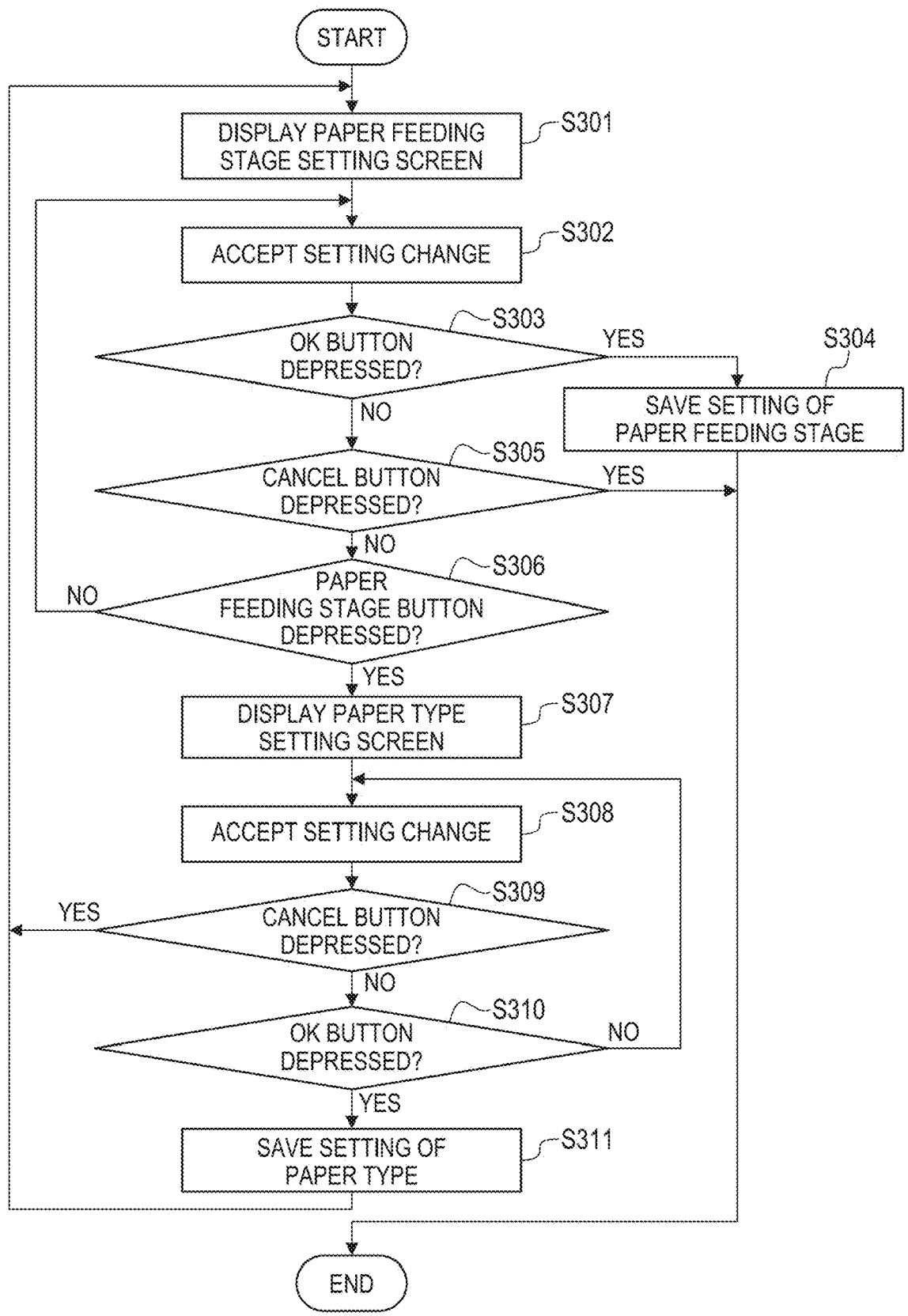
FIG. 3 is a flowchart for describing a paper feeding stage setting process.
Figure 4A:
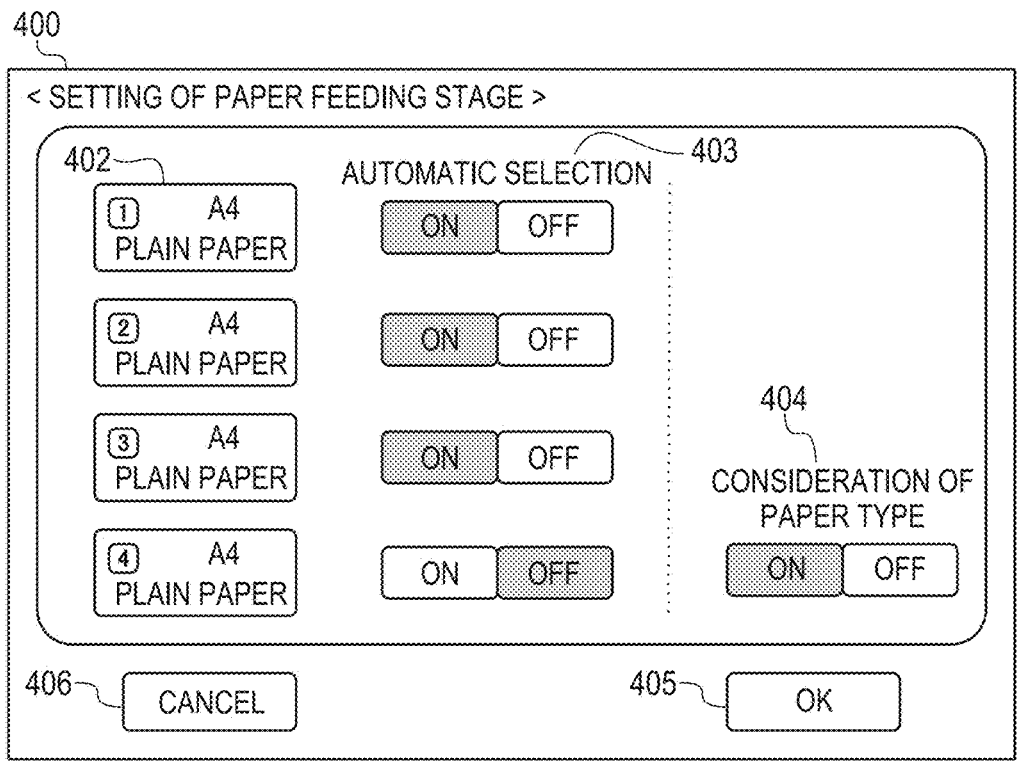
FIGS. 4A and 4B are diagrams illustrating display examples of a displaying unit.
Figure 4B:
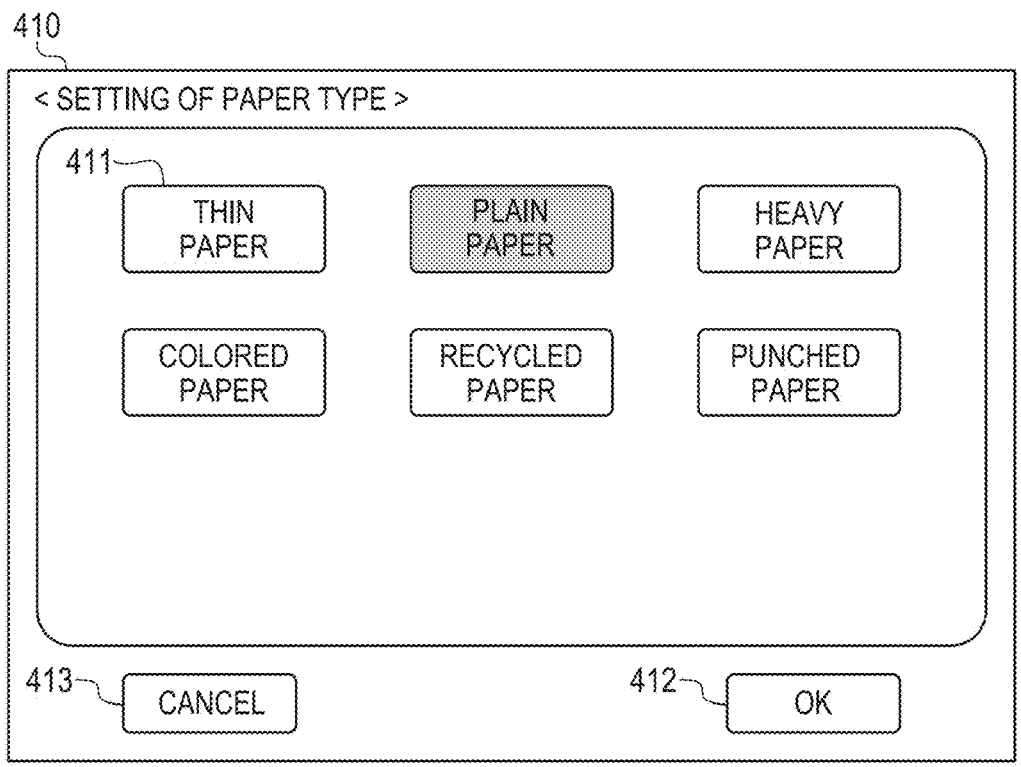

FIG. 3 is a flowchart for describing a paper feeding stage setting process by the image forming apparatus 101. FIGS. 4A and 4B are diagrams illustrating display examples of the displaying unit 103. The paper feeding stage setting process is a process which is executed in accordance with that a setting item of the paper information was selected through a setting screen. First, the setting screen will be described. FIG. 4A is the diagram illustrating the display example of a paper feeding stage setting screen 400. A plurality of paper feeding stage buttons 402 corresponding to the paper feeding stages, a plurality of automatic selection switches 403 corresponding to the paper feeding stages, a paper type consider switch 404, an OK button 405, and a cancel button 406 are displayed on the paper feeding stage setting screen 400.

A size and a type of the paper contained in the paper feeding stage are displayed on the paper feeding stage button 402. The paper size is determined based on the positions of the paper guides 202 and 203 provided for the paper feeding stage as mentioned above. As an initial value, plain paper has been set in the paper type. By using the paper feeding stage button 402, the user can designate the type of paper contained in each paper feeding stage.

FIG. 4B is the diagram illustrating the display example of a paper type setting screen 410. When it is detected that the paper feeding stage button 402 was depressed on the paper feeding stage setting screen 400, the CPU 108 switches the display of the displaying unit 103 to the paper type setting screen 410 illustrated in FIG. 4B. A paper type button 411, an OK button 412, and a cancel button 413 are displayed on the paper type setting screen 410. By depressing an arbitrary paper type button 411, the user can set or change the paper type of each paper feeding stage.

The automatic selection switch 403 on the paper feeding stage setting screen 400 is used to determine whether or not the paper feeding stage is set to a candidate of the paper feeding stage which is used a print job in the case where the user input the print job without designating the paper feeding stage. When the automatic selection switch 403 is ON, the paper feeding stage becomes the candidate at the time of the automatic selection of the paper feeding stage. When it is OFF, the paper feeding stage is excluded from the candidate at the time of the automatic selection of the paper feeding stage. The paper type consider switch 404 is used to determine whether or not the paper type is also included in selecting conditions at the time of the automatic selection of the paper feeding stage. When the paper type consider switch 404 is ON, the CPU 108 determines whether or not the paper size and type coincide with the setting of the print job. When the paper type consider switch 404 is OFF, the CPU 108 determines whether or not the paper size coincides with the setting of the print job but does not make a discrimination about whether or not the paper type coincides with the setting of the print job. The OK button 405 is a button to apply the change performed so far. The cancel button 406 is a button to cancel the setting change performed so far.

The setting of the automatic selection set by the automatic selection switch 403 is also used to a discrimination about whether or not the paper feeding stage is set to a target of the foregoing ACC function. In the ACC function, when all of the paper in the paper feeding stage which is used for the printing has fully been used, whether or not the substitutable paper exists in another paper feeding stage is determined on the basis of the paper size and type of each paper feeding stage mentioned above, and if such paper exists, the paper feeding stage used at the time of the printing is switched to such a paper feeding stage and the printing is continued. If the paper type consider switch 404 is OFF, whether or not the paper of the same paper size as that of the paper feeding stage in which all of the paper has fully been used exists in another paper feeding stage is determined.

Subsequently, the paper feeding stage setting process will be described with reference to FIG. 3. In S301, the CPU 108 displays the paper feeding stage setting screen 400 to the displaying unit 103. Then, in S302, the CPU 108 accepts the user operation through the paper feeding stage setting screen 400. Subsequently, in S303, the CPU 108 determines whether or not the OK button 405 has been depressed. If the OK button 405 has been depressed (YES in S303), the CPU 108 progresses the process to S304. If the OK button 405 is not depressed (NO in S303), the CPU 108 progresses the process to S305. In S304, on the paper feeding stage setting screen 400, the CPU 108 saves the setting of the set paper feeding stage into the EEPROM 112 and finishes the process.

In S305, the CPU 108 determines whether or not the cancel button 406 has been depressed. If the cancel button 406 has been depressed (YES in S305), the CPU 108 finishes the process without saving the setting of the paper feeding stage. If the cancel button 406 is not depressed (NO in S305), the CPU 108 progresses the process to S306. In S306, the CPU 108 determines whether or not the paper feeding stage button 402 has been depressed. If the paper feeding stage button 402 has been depressed (YES in S306), the CPU 108 progresses the process to S307. If the paper feeding stage button 402 is not depressed (NO in S306), the CPU 108 progresses the process to S302 and accepts the setting change.

In S307, the CPU 108 displays the paper type setting screen 410 to the displaying unit 103. Subsequently, in S308, the CPU 108 accepts the setting change from the user. Then, in S309, the CPU 108 determines whether or not the cancel button 413 has been depressed. If the cancel button 413 has been depressed (YES in S309), the CPU 108 progresses the process to S301 and displays the paper feeding stage setting screen 400. If the cancel button 413 is not depressed (NO in S309), the CPU 108 progresses the process to S310.

In S310, the CPU 108 determines whether or not the OK button 412 has been depressed. If the OK button 412 has been depressed (YES in S310), the CPU 108 progresses the process to S311. If the OK button 412 is not depressed (NO in S310), the CPU 108 progresses the process to S308 and accepts the setting change. In S311, the CPU 108 saves the setting of the paper type into the EEPROM 112 and progresses the process to S301. By those processes, the user can perform the setting for the paper type of the paper feeding stage and the automatic selection.

Figure 5:
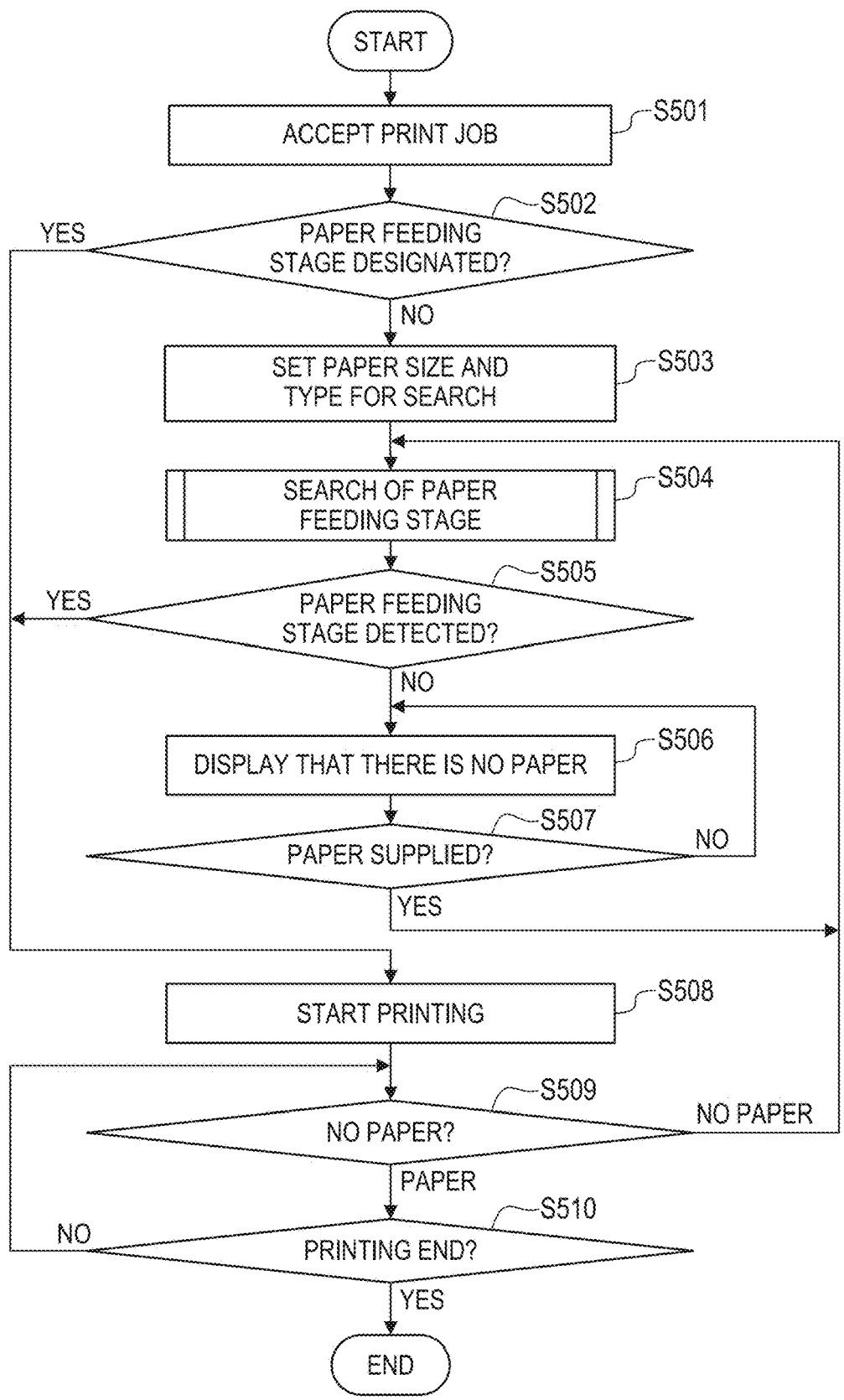
FIG. 5 is a flowchart for describing a printing process.

FIG. 5 is a flowchart for describing a printing process by the image forming apparatus 101. In the printing process, the paper feeding stage is selected in accordance with the setting of the paper feeding stage set in the paper feeding stage setting process. The printing process is executed based on that the image forming apparatus 101 received print data from the outside. In S501, the CPU 108 of the image forming apparatus 101 accepts a print job. Subsequently, in S502, the CPU 108 determines whether or not there is a clear designation of the paper feeding stage in the print job accepted in S501. If the designation of the paper feeding stage exists (YES in S502), the CPU 108 progresses the process to S508. If there is no designation of the paper feeding stage exists (NO in S502), the CPU 108 progresses the process to S503.

In order to select the paper feeding stage which is optimum to the accepted print job, in S503, the CPU 108 sets the paper size and type of the print job into the paper size and type for search. Subsequently, in S504, the CPU 108 executes the search of the paper feeding stage. In the paper feeding stage searching process (S504), the CPU 108 searches for the paper feeding stage of the paper which is used for the printing corresponding to the print job accepted in S501. The present process will be described hereinafter with reference to FIG. 6. In S505, the CPU 108 confirms whether or not the paper feeding stage has been detected in the paper feeding stage searching process (S504). If the paper feeding stage has been detected (YES in S505), the CPU 108 progresses the process to S508. If the paper feeding stage is not detected (NO in S505), the CPU 108 progresses the process to S506.

In S506, the CPU 108 displays a message showing no paper to the displaying unit 103. Subsequently, in S507, the CPU 108 waits until the paper is supplied. When the paper is supplied (YES in S507), in order to search for the paper feeding stage again, the processing routine advances to S504. In S508, the CPU 108 starts the printing process. If the paper feeding stage has been designated in the print job, the CPU 108 controls so as to use the paper in the designated paper feeding stage. If the paper feeding stage is not designated and if the paper feeding stage which is used has been designated in the paper feeding stage searching process (S504), the CPU 108 controls so as to use the paper in the determined paper feeding stage. In the printing process, the CPU 108 starts the printing based on the print data in cooperation with the printer unit 105.

Subsequently, in S509, the CPU 108 determines whether or not no paper has occurred during the printing. If no paper has occurred (YES in S509), the CPU 108 progresses the process to S504 in order to select the paper feeding stage which is used next. If no paper does not occur (NO in S509), the CPU 108 progresses the process to S510. It is assumed that the CPU 108 determines the presence or absence of the paper on the basis of the state notification which is notified from the printer unit 105. In S510, the CPU 108 determines whether or not the printing based on the print job has been completed. If the printing is not completed (NO in S510), the CPU 108 progresses the process to S509. If the printing has been completed (YES in S510), the CPU 108 finishes the process.

Figure 6:
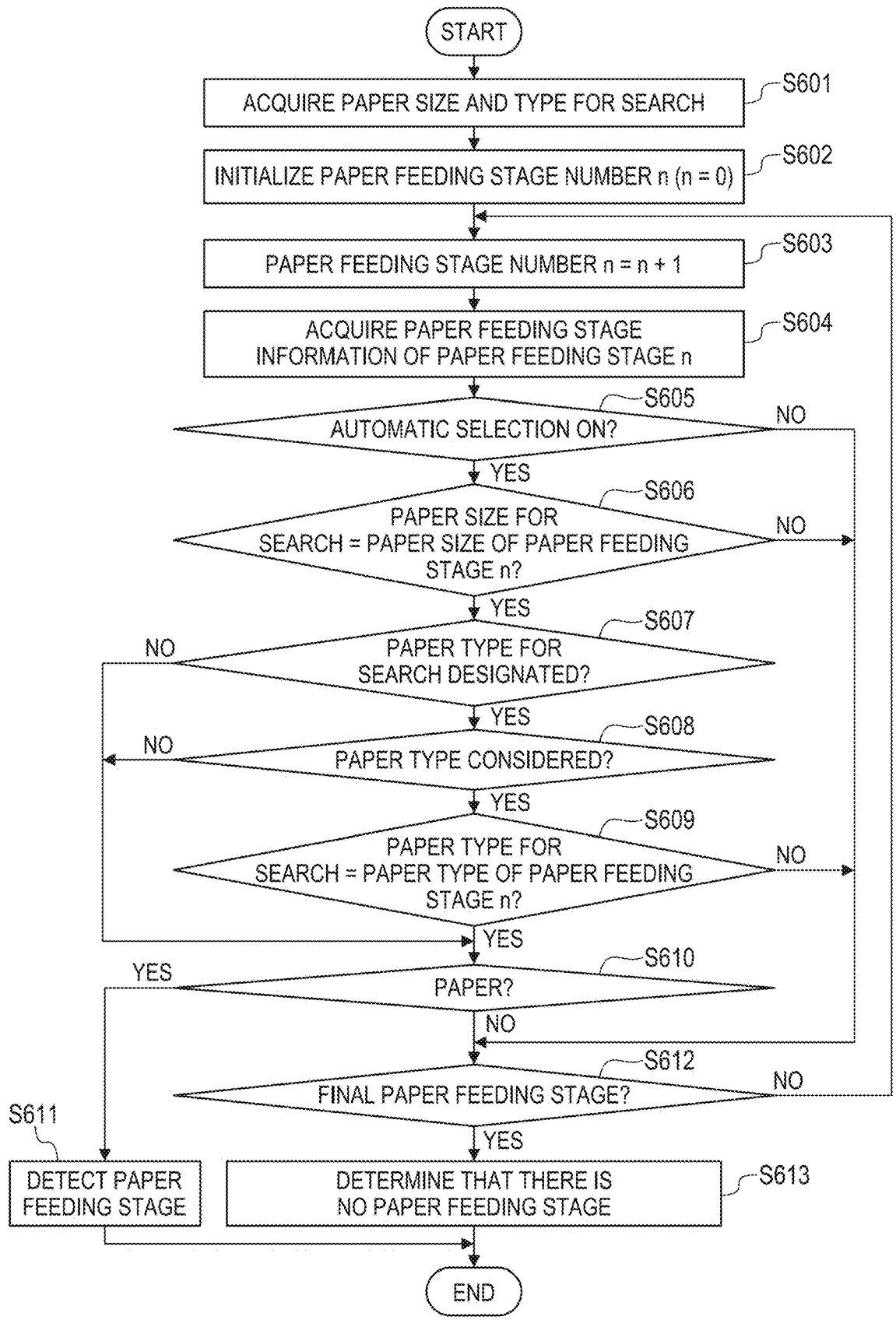
FIG. 6 is a flowchart for describing a paper feeding stage searching process.

FIG. 6 is a flowchart for describing a detailed process in the paper feeding stage searching process (S504). In S601, the CPU 108 acquires the paper size and type for searching for the paper feeding stage. In the present process, the paper size and type of the print job set in S503 are acquired. Subsequently, in S602, the CPU 108 initializes a paper feeding stage number n to 0. The paper feeding stage number is a value indicating what number the paper feeding stage is. The number of paper feeding stages of the image forming apparatus 101 in the embodiment is equal to 4 and the paper feeding stage number n is indicated by a numerical value of any one of 1 to 4. Subsequently, in S603, the CPU 108 calculates a value acquired by adding 1 to the paper feeding stage number n. When n=0 in S602, n is set to 1 by the process of S603. After that, the process of S603 is repeatedly executed and n is increased one by one. Then, in S604, the CPU 108 acquires paper feeding stage information of the paper feeding stage n. The paper feeding stage information denotes information of the paper feeding stage set in S304 or S311 or information about the paper size and the presence or absence of the paper which were acquired by the image forming apparatus 101 by using the sensors or the like.

In S605, the CPU 108 determines whether or not the paper feeding stage n is a target of the automatic selection. The discrimination about whether or not it is the target of the automatic selection is made in accordance with the operation of the automatic selection switch 403 on the paper feeding stage setting screen 400. If the paper feeding stage n is not the target of the automatic selection (NO in S605), since such a paper feeding stage is excluded from the target of the automatic selection, the CPU 108 does not perform the comparison about the paper size, paper type, or the like but progresses the process to S612 in order to search for the next paper feeding stage. If the paper feeding stage n is the target of the automatic selection (YES in S605), the CPU 108 progresses the process to S606. In S606, the CPU 108 compares the paper size for search acquired in S601 with the paper size of the paper feeding stage n acquired in S604. If the paper sizes differ (NO in S606), since such a paper feeding stage is excluded from the target of the automatic selection, the CPU 108 progresses the process to S611. If the paper sizes coincide (YES in S606), the CPU 108 progresses the process to S607.

In S607, the CPU 108 determines whether or not the paper type for search has been designated. If it is not designated (NO in S607), the CPU 108 determines that an arbitrary paper type may be designated, and progresses the process to S610 by regarding such a paper feeding stage as a candidate of the paper feeding stage of the automatic selection. If the paper type for search has been designated (YES in S607), the CPU 108 progresses the process to S608. In S608, the CPU 108 determines whether or not the paper type is considered at the time of the automatic selection of the paper type. The discrimination about whether or not the paper type is considered is made by the CPU 108 in accordance with the operation of the paper type consider switch 404 on the paper feeding stage setting screen 400. If the consideration of the paper type is OFF (NO in S608), the paper type is excluded from the comparing conditions and the CPU 108 determines that an arbitrary paper type may be designated. The CPU 108 progresses the process to S610 by regarding such a paper feeding stage as a candidate of the paper feeding stage of the automatic selection. If the consideration of the paper type is ON (YES in S608), the CPU 108 progresses the process to S609.

In S609, the CPU 108 compares the paper type for search acquired in S601 with the paper type of the paper feeding stage n acquired in S604. If the paper types differ (NO in S609), since the paper feeding stage is excluded from the candidate of the automatic selection, the CPU 108 progresses the process to S612. If the paper types are the same (YES in S609), the CPU 108 progresses the process to S610. In S610, the CPU 108 determines whether or not there is paper in the paper feeding stage n. If there is the paper (YES in S610), the CPU 108 progresses the process to S611. If there is no paper (NO in S610), the CPU 108 progresses the process to S612. In S611, the CPU 108 detects the paper feeding stage of the processing target as a relevant paper feeding stage.

In S612, the CPU 108 determines whether or not the paper feeding stage of the processing target is a final stage. If it is not the final stage (NO in S612), the CPU 108 progresses the process to S603. If it is the final stage (YES in S612), the CPU 108 progresses the process to S613. In S613, the CPU 108 determines that there is no paper. For example, when the paper feeding stage number n is equal to 1, since the paper feeding stage of the processing target is not the final stage in S612, the CPU 108 progresses the process to S603 and executes the processes of the paper feeding stage number 2 and subsequent numbers. Since the number of paper feeding stages of the image forming apparatus 101 of the embodiment is equal to 4, if the paper feeding stage number n is equal to 4 in S612, the CPU 108 progresses the process to S613 and determines that there is no paper. By those processes, even if the user does not designate the paper feeding stage, the image forming apparatus 101 can automatically select the paper feeding stage and execute the printing process.

Figure 7:
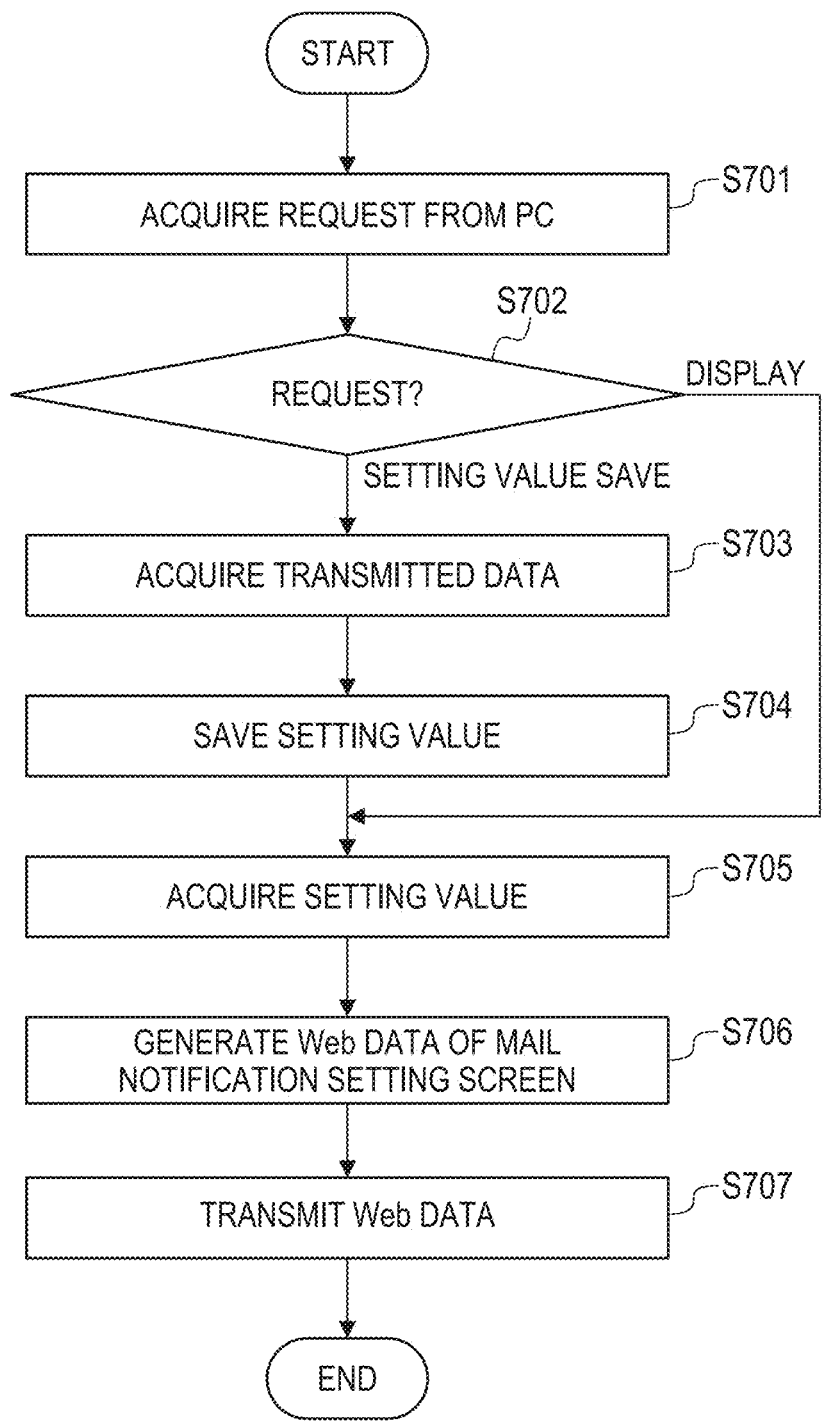
FIG. 7 is a flowchart for describing a mail notification setting process.

FIG. 7 is a flowchart for describing a mail notification setting process by the image forming apparatus 101. If a preset event occurred, the image forming apparatus 101 of the embodiment performs a mail notification to a preset mail address serving as a notification destination. As a preset event, a case such as no toner, no staple, or no paper in which it is necessary to supply consumables can be mentioned. A case such as collected toner full in which it is necessary to exchange a container or a case such as jam in which if the paper is not removed, the image forming apparatus 101 is held in an unusable state can be mentioned. If such an event occurred, the image forming apparatus 101 performs a mail notification. Therefore, even when another operation is being executed in the PC 116, the user can know that the event occurred and it is necessary to take some procedure to the image forming apparatus 101.

With respect to the mail address and the setting of the event, the user having an administrator authority for the image forming apparatus 101 can set them, and a mail address of an arbitrary another user and an event which is notified to such a mail address can be set. As an event which can be set, the foregoing no toner, collected toner full, no staple, no paper, jam, service call, or the like can be mentioned.

The mail notification setting process is a setting process regarding the mail notification at the time of occurrence of such an event. In the embodiment, it is assumed that the user executes the operation to set the mail notification from the Web browser of the PC 116. In S701 in FIG. 7, the CPU 108 accepts a request from the PC 116 through the LAN/WAN (network) 114. Subsequently, in S702, the CPU 108 confirms the contents of the request from the PC 116. When the request contents indicates a displaying request, the CPU 108 progresses the process to S705. When the request contents indicates a saving of setting values, the CPU 108 progresses the process to S703.

In S705, the CPU 108 acquires the setting values of the mail notification setting. Although details of the mail notification setting will be described hereinafter, the mail address and ON/OFF to each event such as no paper or the like are included in the setting values. Subsequently, in S706, the CPU 108 generates data of the mail notification setting screen. It is assumed that the screen data is expressed by general Web data such as HTML/JavaScript (registered trademark)/style sheet or the like. Then, in S707, the CPU 108 transmits the Web data to the PC 116.

Figure 8:
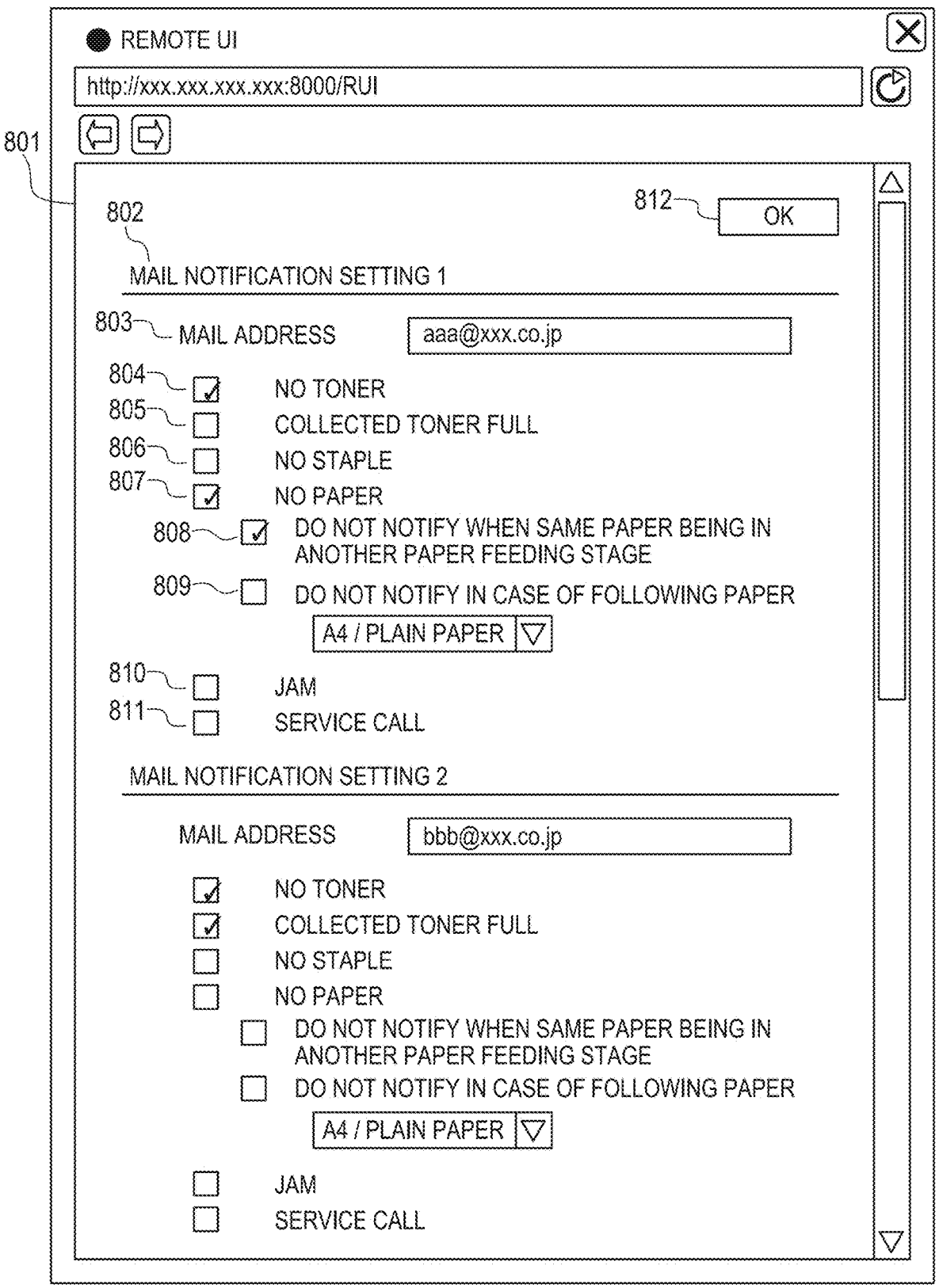
FIG. 8 is a diagram illustrating a display example of a mail notification setting screen.

FIG. 8 is a diagram illustrating a display example of the mail notification setting screen. A mail notification setting screen 801 is displayed on the Web browser of the PC 116. A plurality of mail notification settings 802 and an OK button 812 are displayed on the mail notification setting screen 801. A mail address 803 and a plurality of events 804 to 811 are displayed for each mail notification setting 802. The user can input a destination to which a notification is performed when an event has occurred into the mail address 803. In the check boxes of 804 to 811, the user can also input whether or not the notification is accepted in the case of any one of the events. The CPU 108 sets excluding conditions serving as conditions in which the mail notification is not performed in response to the input according to the user operation. In the embodiment, no toner 804, collected toner full 805, no staple 806, no paper 807, jam 810, and service call 811 are displayed as events. However, types and the number of events which can be set in the image forming apparatus 101 are not limited to those in the embodiment.

With respect to the event of no paper 807, detailed settings 808 and 809 can be further set. Reference numeral 808 is a check box which is marked to prevent the mail notification from being performed in the case where even if the paper disappeared in one paper feeding stage, the same paper exists in another paper feeding stage. Reference numeral 809 is a check box which is marked to prevent the mail notification from being performed in the case where even if the paper disappeared in the paper feeding stage, the paper is the paper set in 809. In 809, the paper size and type are designated. Similarly, also in 808, the size and type of the paper which is regarded as the same paper can be also designated. The OK button 812 is a button to decide the setting values which were input so far. When the user depresses the OK button 812, transmitted data including the mail notification setting 802 is notified to the CPU 108 of the image forming apparatus 101 from the Web browser of the PC 116.

Returning to FIG. 7, in S703, the CPU 108 acquires the transmitted data notified from the Web browser of the PC 116. Subsequently, in S704, the CPU 108 saves the setting values into the EEPROM 112 as a non-volatile memory. Then, the processes in S705 and subsequent steps are executed. FIG. 9 is a diagram illustrating an example of data which is saved in the EEPROM 112 in S704. In the example illustrated in FIG. 9, three mail notification related information 900 (910, 920) have been stored in the EEPROM 112. Identification information is added to each mail notification related information. In the example of FIG. 9, the identification information is indicated by (1) to (3). The three mail notification related information are properly given hereinbelow as mail notification related information (1), mail notification related information (2), and mail notification related information (3), respectively.

Each mail notification related information 900 includes a mail notification setting 901 and a transmitted flag 902. Setting values which were input in the mail notification setting 802 on the mail notification setting screen 801 have been saved in the mail notification setting 901. Specifically speaking, the mail address serving as a notification destination and the setting of OFF/ON for deciding which event is notified to such a mail address have been held. Values have been saved in the transmitted flag 902 on a unit basis of execution of the mail notification. When the relevant event has occurred and the mail notification is performed once, the flag is set to ON. When the relevant event is released, the flag is set to OFF. The flag is referred to in order to prevent such a situation that the mail notification is performed twice at the timing when a power source of the image forming apparatus 101 is turned OFF/ON.

Figure 10:
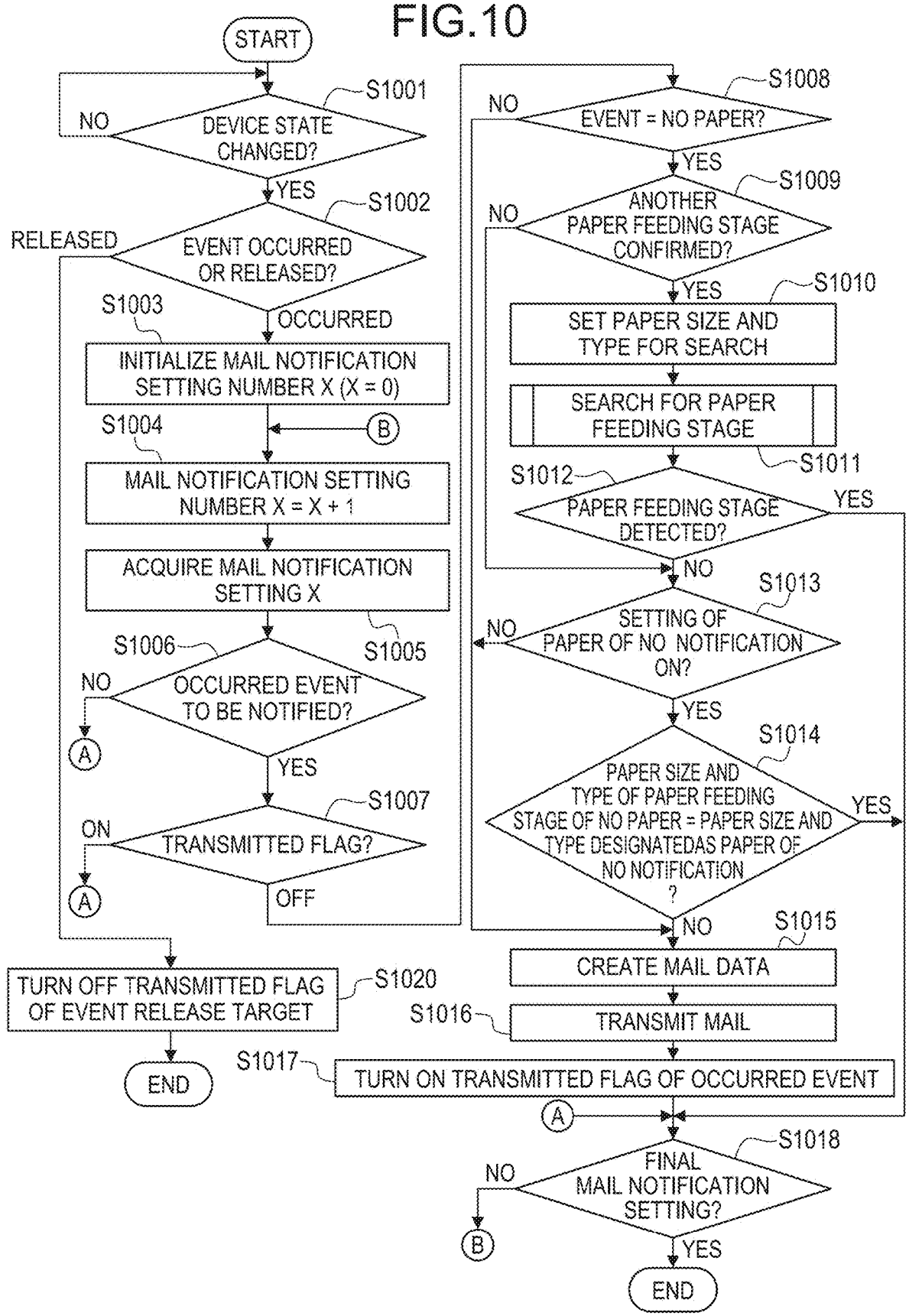
FIG. 10 is a flowchart for describing a mail notifying process.

FIG. 10 is a flowchart for describing the mail notifying process by the image forming apparatus 101. It is assumed that at the time of starting the mail notifying process, the mail notification setting process described with reference to FIG. 7 has been completed. In the mail notifying process, the process is executed on a mail address unit basis. That is, as a whole process, to one mail address setting, whether or not each event is notified is made and the mail notification is performed to the relevant mail address. Thus, even if a plurality of events occurred, the event contents can be disclosed in the same mail. For example, in the example illustrated in FIG. 9, the CPU 108 acquires from the EEPROM 112 the setting values in order of the mail notification related information (1), mail notification related information (2), and mail notification related information (3) and executes the process.

First, in S1001, the CPU 108 monitors a state change of the device on the basis of the information which is notified from the printer unit 105, scanner unit 106, and the like. Subsequently, in S1002, the CPU 108 determines that the state change of the device is which one of "event occurred" and "event released". For example, the state change from the presence of paper to no paper corresponds to "event occurred" of no paper. The state change from no paper to the presence of paper corresponds to "event released" of no paper. In the case of "event occurred" (occurred in S1002), the CPU 108 progresses the process to S1003. In the case of "event released" (released in S1002), the CPU 108 progresses the process to S1020.

In S1003, the CPU 108 initializes a mail notification setting number X which is used as a loop variable to 0. As described in FIG. 8, in the embodiment, a plurality of combinations of the mail address for notification and the event which is notified to the mail address can be set. For example, as illustrated in FIG. 8, if two mail addresses "aaa@xxx.co.jp" and "bbb@xxx.co.jp" have been set as mail addresses of the notification targets of the events, it is necessary to determine whether or not the event notification is performed to the two mail addresses. In the embodiment, by repeating the processes of S1005 to S1017 the number of times as many as the number of combinations of the notification destination mail address and the event, the notification to a plurality of mail addresses for notification is performed. It is now assumed that the CPU 108 properly switches the notification destination mail address and a reference destination of setting information showing a type of event in accordance with the loop variable.

In S1004, the CPU 108 adds 1 to the mail notification setting number X. In the loop of the first time, X=1. Subsequently, in S1005, the CPU 108 acquires mail notification setting of the first mail notification related information (X) from the EEPROM 112. In the loop of the first time, since X=1, the mail notification setting 901 of the mail notification related information (1) is acquired. In the loop of the second time, a value of the mail notification related information (2) is acquired. Subsequently, in S1006, the CPU 108 determines whether or not the occurred event is the notification target. If it is not the notification target (NO in S1006), the CPU 108 progresses the process to S1018. If it is the notification target (YES in S1006), the CPU 108 progresses the process to S1007.

In S1007, the CPU 108 determines whether or not the transmitted flag of the occurred event is ON. If it is OFF (OFF in S1007), the CPU 108 progresses the process to S1008. If it is ON (ON in S1007), the CPU 108 progresses the process to S1018. If the transmitted flag is ON, since the mail has already been notified, the processes in S1008 for mail notification and subsequent steps are not executed. Thus, such a situation that the mail notification is performed twice by OFF/ON of the image forming apparatus 101 can be prevented.

In S1008, the CPU 108 determines whether or not the occurred event is no paper. If it is no paper (YES in S1008), the CPU 108 progresses the process to S1009. In the case of an event other than no paper (NO in S1008), the CPU 108 progresses the process to S1015. In the embodiment, on the mail notification setting screen 801, only the case of no paper corresponds to that the detailed setting (808, 809) is included. In the case of events other than no paper, the processing routine advances to the mail transmitting process in S1015 and subsequent steps.

In S1009, if the same paper exists in another paper feeding stage, the CPU 108 determines whether or not the setting of no notification is ON. The user can turn ON a setting value by validating the check box of 808 and saving the setting. The setting value is saved into an area of confirmation of another paper feeding stage of no paper of the mail notification setting 901 in the EEPROM 112. When the setting is OFF (NO in S1009), since the confirmation of another paper feeding stage is not performed, the CPU 108 progresses the process to S1013. If it is ON (YES in S1009), the CPU 108 progresses the process to S1010.

In S1010, the CPU 108 sets the paper size and type of the paper feeding stage of no paper into the paper size and type for search. Subsequently, in S1011, the CPU 108 searches for the paper feeding stage. The searching process of the paper feeding stage in S1011 is similar to the paper feeding stage searching process (S504) described with reference to FIGS. 5 and 6. In S1012, the CPU 108 confirms whether or not the paper feeding stage has been detected in the paper feeding stage searching process (S1011). If the paper feeding stage has been detected (YES in S1012), the CPU 108 progresses the process to S1018. Since the printing can be continued by using the paper in the detected paper feeding stage in this manner, the mail notifying process is not executed. If the paper feeding stage is not detected (NO in S1012), the CPU 108 progresses the process to S1013.

In S1013, in the case of the paper designated by the user, the CPU 108 determines whether or not the setting of no notification is ON. The user can turn ON a setting value by validating the check box of 809 and saving the setting. The setting value is saved into an area of "paper of no notification (of no paper)" in the mail notification setting 901 in the EEPROM 112. Such information is an example of the information showing the paper as a target of notification exclusion. If the setting of no notification is OFF (NO in S1013), since the confirmation of the designated paper is not performed, the CPU 108 progresses the process to S1015. If it is ON (YES in S1013), the CPU 108 progresses the process to S1014. In S1014, the CPU 108 determines whether or not the paper size and type of the paper feeding stage of no paper coincide with the paper size and type of the paper designated as paper of no notification. If they coincide (YES in S1014), since there is no need to perform the mail notification, the CPU 108 progresses the process to S1018. If they do not coincide (NO in S1014), since it is necessary to perform the mail notification, the CPU 108 progresses the process to S1015. As another example, the discrimination target in S1014 may be only one of the paper type and the paper size.

In S1015, the CPU 108 creates mail data 1101. An example of the mail data 1101 which is transmitted here is illustrated in FIG. 11. As information other than the information of the occurred event, occurrence date and time, a serial number uniformly showing the image forming apparatus 101, and an installation site are included in the mail data. On the basis of those information, the administrator (user) who received the mail notification can determine the image forming apparatus 101 with which he should deal and the contents of the operation. The contents which differ in dependence on the occurred event are shown in items to be notified. The mail data is an example of the notification information. Subsequently, in S1016, the CPU 108 transmits the created mail data to the mail server 115. As a destination upon transmission, a mail address of the mail notification setting saved in the EEPROM 112 is used.

Subsequently, in S1017, the CPU 108 turns ON the transmitted flag of the occurred event and saves into the transmitted flag 902 in the EEPROM 112. Then, in S1018, the CPU 108 determines whether or not the mail notification setting is the final mail notification setting. If the unprocessed mail notification setting exists (NO in S1018), the processing routine advances to S1004. If the CPU 108 repeated the processes of S1004 to S1017 the number of times as many as the number of all mail notification settings (YES in S1018), the mail notifying process is finished. In S1020, the CPU 108 turns OFF the transmitted flag as a target of the event release, saves into the transmitted flag 902 in the EEPROM 112, and finishes the mail notifying process. For example, when the paper is supplied and the event of no paper is released, the transmitted flag for preventing the double transmission is changed to OFF. By this process, if the event of no paper occurred subsequently, the CPU 108 can advance to a sequence of S1008 and subsequent steps and can perform the mail notification of no paper again.

By those processes, when the same paper as that in the paper feeding stage of no paper exists in another paper feeding stage or in the case of the paper in which there is no need to accept the notification, the administrator (user) does not need to receive the mail notification with which he does not need to deal. The mail notifying process is an example of a controlling process for controlling in such a manner that when no paper is detected and the paper does not satisfy the excluding conditions, the notification information is notified to a preset notification destination (mail address), and when the paper satisfies with the excluding conditions, the notification information is not notified. The excluding conditions in the embodiment are that the same paper as the paper in the paper feeding stage of no paper exists in another paper feeding stage and that the paper in the paper feeding stage of no paper corresponds to the paper of the setting of no notification. As mentioned above, the image forming apparatus 101 of the embodiment can properly perform the notification of no paper.

As a modification of the embodiment, in the discrimination about whether or not the same paper exists in another paper feeding stage, the CPU 108 may determine in such a manner that when at least one of the size and type of the paper is the same, such paper is the same paper. In 809 in FIG. 8, also with respect to the paper which is set as a target of the notification exclusion, the CPU 108 may specify the target of the notification exclusion by at least one of the size and type of the paper.

Although the exemplary embodiments of the present invention have been described in detail above, the invention is not limited to the specific embodiments but various modifications and changes are possible within the scope of the essence of the invention disclosed in claims.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-120752, filed Jun. 20, 2017, which is hereby incorporated by reference herein in its entirety.

What is claimed is:

1. An image forming apparatus comprising:
    a plurality of containers configured to contain sheets, wherein sheets having predetermined attribute as types of the contained sheets have been registered to a first container and a second container among the plurality of containers;
    an image forming device configured to perform image formation on a sheet; and
    one or more controllers configured to:
        accept a setting regarding a notification function, wherein the notification function is a function of notifying a predetermined e-mail address that one container of the plurality of containers is empty, and the notification function is capable of changing a state to any one of a plurality of setting states including a first setting state and a second setting state; and
        in case of accepting an instruction of the image formation for which the sheet having the predetermined attribute is used, switching a sheet supply source to the second container based on a fact that the first container is empty, and then performing the image formation,
        in a case where the notification function is in the first setting state, execute the notification irrespective of whether or not the second container is empty when the first container is empty, and
        in a case where the notification function is in the second setting state, execute the notification when the first container is empty and the second container is empty, and do not execute the notification when the first container is empty and the second container is not empty.

2. The image forming apparatus according to claim 1, wherein
    the one or more controllers are configured to accept a designation of a sheet attribute excluded from a notification target.

3. The image forming apparatus according to claim 1, wherein a sheet attribute includes at least one of a size of the sheet and a type of the sheet.

4. The image forming apparatus according to claim 1, wherein the sheet contained in the second container is a sheet having a size same as that of the sheet contained in the first container.

5. The image forming apparatus according to claim 1, wherein the sheet contained in the second container is a sheet having a size and a type same as those of the sheet contained in the first container.

6. The image forming apparatus according to claim 1, wherein
    the one or more controllers are configured to accept a designation of a sheet type to be contained in the first container, and
    the sheet type capable of being designated includes at least one of a thin paper, a plain paper, a thick paper, a colored paper, a recycled paper, and a punched paper.

7. The image forming apparatus according to claim 1, wherein the one or more controllers are configured to provide, to an external apparatus, a Web page allowing to designate whether or not to execute the notification.

8. The image forming apparatus according to claim 1, wherein the one or more controllers are configured to provide, to an external apparatus, a Web page allowing to designate the predetermined e-mail address.

9. The image forming apparatus according to claim 8, wherein the Web page allows designating a plurality of predetermined e-mail addresses.

10. The image forming apparatus according to claim 1, wherein the one or more controllers are configured to execute at least one of notification information of no toner, notification information of collected toner full, notification information of no staples, notification information of jam, and notification information of service call, to the predetermined e-mail address through a network interface.

11. The image forming apparatus according to claim 1, wherein
    the one or more controllers are configured to accept a designation as to whether or not to use information indicating that the sheet usable in the one image forming processing is not fed from another container, when deciding whether or not to execute the notification, and
    the first setting state is a state that not using the information is designated and the second setting state is a state that using the information is designated.

12. The image forming apparatus according to claim 1, wherein the notification includes information indicating that no sheet in a subject.

13. The image forming apparatus according to claim 1, wherein the notification includes date-and-time information.

14. The image forming apparatus according to claim 1, wherein the notification includes apparatus identification information.

15. The image forming apparatus according to claim 1, further comprising a sensor provided for the first container.

16. The image forming apparatus according to claim 1, wherein the one or more controllers are configured to set a transmitted flag to ON according to execution of the notification.

17. The image forming apparatus according to claim 1, wherein the one or more controllers are configured to set a transmitted flag to OFF according to acquisition of information indicating that a sheet is supplied to the first container.

18. The image forming apparatus according to claim 1, wherein, in the second setting state, upon condition that the one or more controllers acquire information indicating that there is no sheet of the same type usable in the one image forming processing in any of the containers in the image forming apparatus, the one or more controllers execute the notification to the predetermined e-mail address through a network interface and upon condition that the one or more controllers acquire the information indicating that there is any sheets of the same type usable in the one image forming processing in any of the containers in the image forming apparatus, the one or more controllers do not execute the notification to the predetermined e-mail address.

19. The image forming apparatus according to claim 1, wherein the one or more controllers are configured to set either one of the first setting state or the second setting state of the image forming apparatus in accordance with an input via input unit.

20. A controlling method for an image forming apparatus having a plurality of containers configured to contain sheets, wherein sheets having predetermined attribute as types of the contained sheets have been registered to a first container and a second container among the plurality of containers, and the image forming device configured to perform image formation on a sheet, the method comprising:

accepting a setting regarding a notification function, wherein the notification function is a function of notifying a predetermined e-mail address that one container of the plurality of containers is empty, and the notification function is capable of changing a state to any one of a plurality of setting states including a first setting state and a second setting state; and in case of accepting an instruction of the image formation for which the sheet having the predetermined attribute is used, switching a sheet supply source to the second container based on a fact that the first container is empty, and then performing the image formation, in a case where the notification function is in the first setting state, executing the notification irrespective of whether or not the second container is empty when the first container is empty, and in a case where the notification function is in the second setting state, executing the notification when the first container is empty and the second container is empty, and not executing the notification when the first container is empty and the second container is not empty.

21. A non-transitory computer-readable storage medium storing a program for causing a computer to execute a controlling method for an image forming apparatus having a plurality of containers configured to contain sheets, wherein sheets having predetermined attribute as types of the contained sheets have been registered to a first container and a second container among the plurality of containers, and an image forming device configured to perform image formation on a sheet, the method comprising:

accepting a setting regarding a notification function, wherein the notification function is a function of notifying a predetermined e-mail address that one container of the plurality of containers is empty, and the notification function is capable of changing a state to any one of a plurality of setting states including a first setting state and a second setting state; and in case of accepting an instruction of the image formation for which the sheet having the predetermined attribute is used, switching a sheet supply source to the second container based on a fact that the first container is empty, and then performing the image formation, in a case where the notification function is in the first setting state, executing the notification irrespective of whether or not the second container is empty when the first container is empty, and in a case where the notification function is in the second setting state, executing the notification when the first container is empty and the second container is empty, and not executing the notification when the first container is empty and the second container is not empty.

\* \* \* \* \*